(12) United States Patent
Winker

(10) Patent No.: US 7,011,481 B2
(45) Date of Patent: Mar. 14, 2006

(54) SECURING NUT INCLUDING A NUT BODY AND STRAINING RING

(76) Inventor: Alexander Winker, Ahornweg 11, 78549 Spaichingen (DE)

( * ) Notice: Subject to any disclaimer, the term of this patent is extended or adjusted under 35 U.S.C. 154(b) by 97 days.

(21) Appl. No.: 09/994,462

(22) Filed: Nov. 26, 2001

(65) Prior Publication Data

US 2003/0049092 A1    Mar. 13, 2003

(30) Foreign Application Priority Data

Sep. 7, 2001    (DE) ................ 101 44 034

(51) Int. Cl.
*F16B 39/28*    (2006.01)
(52) U.S. Cl. ............. 411/277; 411/281; 411/247
(58) Field of Classification Search ........... 411/277, 411/278, 281–283, 6, 7, 9, 246–249
See application file for complete search history.

(56) References Cited

U.S. PATENT DOCUMENTS

| | | | | |
|---|---|---|---|---|
| 987,106 | A * | 3/1911 | Blanton | 411/246 |
| 2,685,812 | A * | 8/1954 | Dmitroff | 411/7 |
| 3,425,314 | A * | 2/1969 | Ohlson | 411/7 |
| 4,176,582 | A * | 12/1979 | Witte | 411/7 |
| 4,236,561 | A * | 12/1980 | Monticelli | 411/280 |
| 4,260,005 | A * | 4/1981 | Stencel | 411/3 |
| 4,408,936 | A * | 10/1983 | Williamson | 411/3 |
| 4,544,312 | A * | 10/1985 | Stencel | 411/3 |
| 5,148,727 | A * | 9/1992 | Williamson | 81/121.1 |
| 6,220,801 | B1 * | 4/2001 | Lin | 411/9 |

FOREIGN PATENT DOCUMENTS

| | | |
|---|---|---|
| DE | 4231320 A1 | 3/1994 |
| DE | 4327461 A1 | 10/1994 |
| EP | 0825354 A2 | 2/1998 |
| WO | WO 94/07040 | 3/1994 |

\* cited by examiner

*Primary Examiner*—Flemming Saether
(74) *Attorney, Agent, or Firm*—Kriegsman & Kriegsman

(57) ABSTRACT

The present invention concerns a securing nut (1) with a nut body (5) and a straining ring (4) that is arranged on the nut body (5) and able to turn, the straining ring (4) being shoved onto a neck (2) of the nut body (5) and secured by clamping. According to the invention, the inner surface of the straining ring (4) has at least two grooves in the form of circular splines (10a, 10b, 10c), they extend across the entire angle region of 360°, and the outer surface of the neck (2) has the same number of cams in the form of spline profiles (20a, 20b, 20c), which extend across an angle range of less than 360°.

20 Claims, 4 Drawing Sheets

SECURING NUT INCLUDING A NUT BODY AND STRAINING RING

BACKGROUND OF THE INVENTION

The present invention concerns a novel securing nut.

Securing or clamping nuts are characterized in that they have a securement or a mechanism to prevent loosening on the bolt, on the shaft, the screw, etc., or to prevent them from getting lost. For example, a plastic ring can be provided on the nut body to prevent it from getting lost. Another familiar form of securement consists in a thread formation, which can be made by conventional fabrication methods known to the practitioner. The plastic ring should not be too narrow or the thread too large, or else the nut can no longer be screwed onto the bolt. Thus, although the securement is reversible, the force which can be applied is limited, so that strong vibration can result in loosening of the nut on the bolt. Another known nut has a slotted neck with an outer thread, on which a straining ring can be screwed. However, such a nut is costly and difficult to fabricate. Another solution calls for having a collar on the thread of the nut and a corresponding groove on the bolt, the shaft, screw, etc., so that when screwing on the nut the collar is forced into the groove. Although this connection is stable, it can no longer be separated, and is thus irreversible. Furthermore, it is costly to fabricate the parts with collar and groove.

A special solution of the problem that is known in the prior art is a wheel securement nut that is slotted in the axial direction, having a continuous screw perpendicular to the slot. Thus, the nut can be screwed on without seizing and then be secured by tightening the screw. But also this special fabrication is costly and troublesome.

Moreover, the so-called "circular spline technique" is in the prior art, as is known, for example, from DE 4,231,320 C2 and DE 196 33,541 C2.

DE 4,231,320 C2 discloses a device for the detachable joining of at least two objects, by means of a (for example) one-piece pin on the first object and a receptacle on the second object, which can be a spline-profile nut. The pin has radially projecting cams in the circumferential direction in the form of spline profiles, while the receptacle has corresponding grooves in the form of spline profiles. The back surfaces of the cams and the hollow surfaces of the grooves basically follow the trend of a logarithmic spiral in relation to their axis. Between cams and grooves a gap is provided for the pin to fit into the receptacle.

DE 196 33,541 C2 concerns a shaft-hub connection, especially in the form of a bolt and a nut which cooperates with it. Spline surfaces radially increasing in the circumferential direction are provided on the outer circumferential surface of the shaft and the inner circumferential surface of the hub. After shaft and hub are joined together, spline surfaces with the same gradient lie opposite each other. Furthermore, elevations and recesses are provided between shaft and hub to achieve a form-fitting axial securement.

SUMMARY OF THE INVENTION

Thus, the object of the present invention is to furnish a securing nut which allows a reversible securement, can be put in place without seizing and then clamped with maximum force, and which is both simple and cheap to produce.

The solution involves a novel securing nut and a method of manufacturing the same, the securing nut comprising a nut body and a straining ring rotationally arranged on the nut body, the straining ring being shoved onto a neck of the nut body and secured by clamping, the inner surface of the straining ring having at least two grooves in the form of circular splines that extend across the entire angular range of 360°, the outer surface of the neck having the same number of cams in the form of spline profiles that extend across an angular range of less than 360°.

The securing nut according to the invention is distinguished in that the nut body has a hollow neck, which has an inner thread and at least two spline profiles on the circumference of the neck, extending for a region of less than 360°. Furthermore, a straining ring is provided, which has at least two circular splines instead of a thread along the inner circumference, extending over a region of 360°. This invented configuration of the securing nut has the effect that the straining ring is fitted onto the neck of the nut body with clearance and is free to turn through a particular angular region, depending on the particular dimensions of the circular splines or spline profiles. When straining ring and neck are twisted, the latter is compressed nonuniformly, since the straining ring only exerts force against the neck at the points of contact between its circular splines and the spline profiles. This alters the cross section contour of the neck, depending on the number of circular splines or spline profiles, from round to oval, triangular, rectangular, etc., so that the neck bears against the thread of the bolt or the screw in the nut at two, three, four, etc., points. These changes are reversible, since the neck is elastic and when the straining ring is loosened the cross section contour again becomes circular.

One advantage of the present invention consists in that the mounting of the nut on an axle, a shaft, a bolt, a screw, etc., is totally independent of the clamping. In other words: the tightening of the nut and the subsequent securing are two totally different and independent work steps. Only when the nut is reliably in its desired position is it secured by clamping. This is not so in the case of nuts with plastic securement or thread deformation. The invented securing nut is also insensitive to strong vibration, since the full available force can be used for the clamping, even though the securement is reversible, as in the case of nuts with plastic securement or thread deformation. A further advantage is that no machining is necessary on the shaft, bolt, etc.

The nut according to the invention is easy and cheap to produce. The straining ring can be made, for example, along with the circular splines by pressing. A method according to the invention calls for pressing the nut body, with the hollow neck having spline profiles, but no thread on the inside, and a somewhat greater wall thickness than is really desired. This rough blank is machined by cutting: at first, the correct wall thickness of the neck is adjusted in a chuck and then the inner thread is generated and the bearing surface of the securing nut is machined, if necessary. The inner thread can also be shaped without cutting. This method has the advantage that the center axis of the inner thread is reliably reproducibly perpendicular to the bearing surface. Straining ring and nut body are then assembled together. The two parts can also be inseparably joined, if desired.

The nut body can also be pressed with smooth outer surface, i.e., without spline profiles, and the spline profiles can be made afterwards by a cutting process, preferably in the same chuck as used to generate the inner thread.

On the other hand, however, the nut can also be produced complete by pressing (for other applications).

The securing nut according to the invention can be used wherever a securement against loosening or detachment is necessary, for example, as wheel securing nuts or as replacement for lock nuts. It can be produced in any desired dimensions.

Advantageous modifications will result from the subclaims. Preferably, three circular splines and three spline profiles are provided, so that there are three points of contact for the clamping and the neck of the nut body is deformed in the direction of a roughly triangular cross section. Thus, each circular spline of the straining ring will extend over an angular region of 120°.

Another preferred embodiment calls for each of the three spline profiles of the neck to extend over an angular range of 30 to 60°, preferably 40 to 50°, especially preferably 45°. This will achieve a good interaction between circular splines and spline profiles and a good clamping action.

While the gradient of the circular splines of the straining ring is preferably substantially linear, it is also advantageous for the gradient of the spline profiles of the neck to be curved prior to the clamping and approximately linear after the clamping. In this way, one achieves a broader bearing surface between circular splines and spline profiles, which avoids stress peaks.

The gradient of the spline profiles can be generated by a circular arc. For practical reasons, the gradient of the circular splines can also be generated by a circular arc, since ideal linear gradients can only be produced with difficulty.

The gradient of the circular splines of the straining ring can be, for example, 1:50 to 1:100, preferably 1:70, and the gradient of the spline profiles of the neck, for example, 1:20 to 1:40, preferably 1:25.

The wall thickness of the neck corresponds preferably to no more than 10% of the inner diameter of the neck, so that a reversible deformation of the neck cross section is possible.

The depth of the circular splines of the straining ring and the spline profiles of the neck can be, for example, 1 to 3%, preferably 1.75%, of the inner diameter (d) of the straining ring (4).

The nut body, including the neck of the securing nut, can furthermore be provided with an inner thread.

BRIEF DESCRIPTION OF THE DRAWINGS

An embodiment of the present invention is explained by means of the enclosed drawings. In these drawings wherein like reference numerals represent like parts.

DETAILED DESCRIPTION OF PREFERRED EMBODIMENTS

Figure 1:
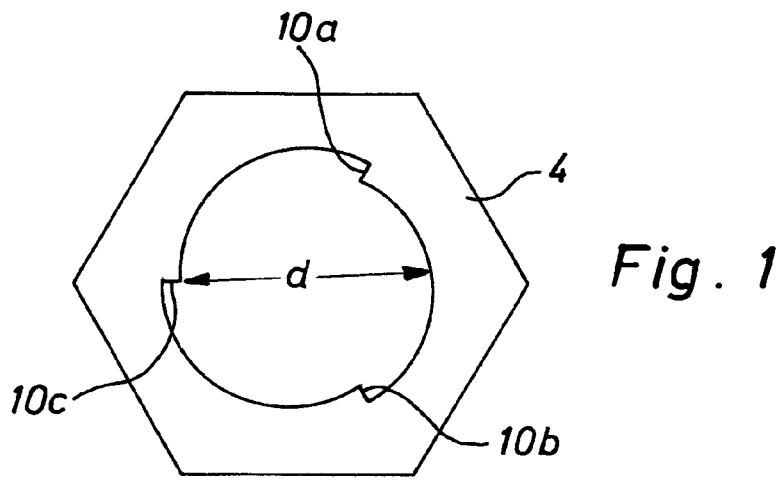
FIG. 1 a schematic, not true-to-scale representation of an example of embodiment of a straining ring for a securing nut according to the invention, in cross section.
Figure 2A:
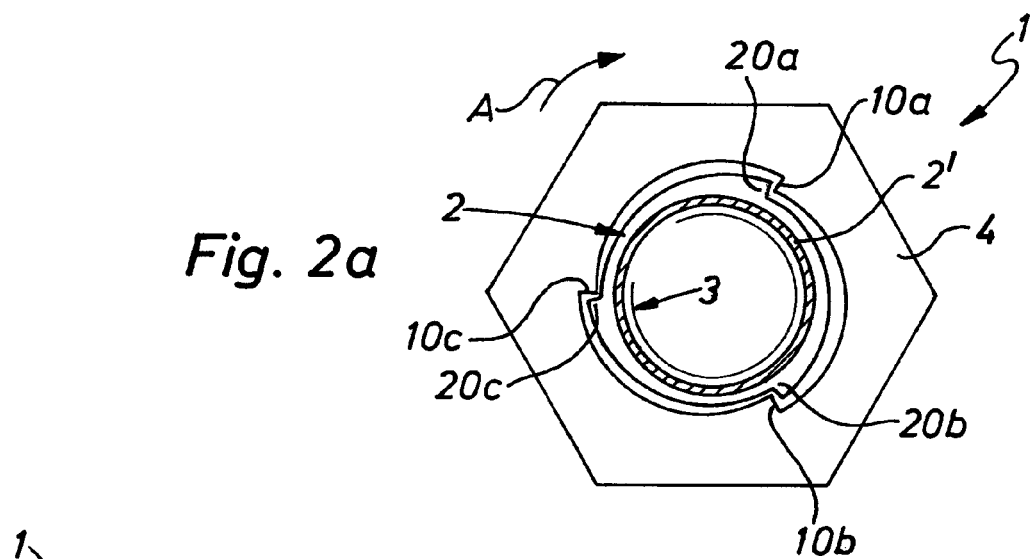
FIG. 2a a schematic, not true-to-scale representation of the straining ring of FIG. 1 on the neck of a nut body before the clamping, in cross section.
Figure 2B:
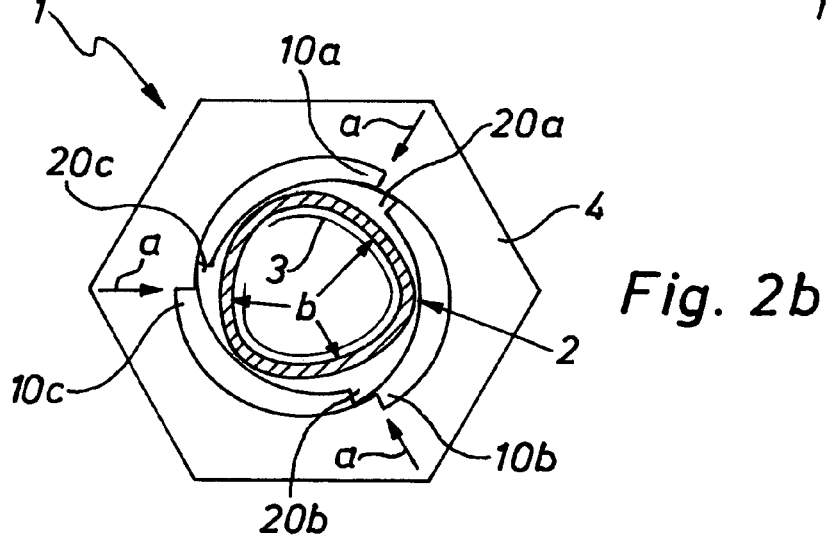
FIG. 2b the illustration of FIG. 2a, after the clamping.

An example of embodiment of a securing nut according to the invention is schematically represented in FIGS. 1 through 2b. The securing nut 1 consists of a nut body and a straining ring 4. The nut body has a neck 2, on which the straining ring 4 is shoved. The nut body including the neck 2, in turn, is provided with an inner thread 3 along its inner surface. Depending on the purpose of use of the securing nut, the nut body can have any desired outer contour, for example, a hexagon. The nut body can also be provided with a flange. All structural parts are made of metal, although the use of plastics is also conceivable.

The straining ring 4 (FIG. 1) can have any desired outer contour, which is a hexagon in the example of embodiment. Along its inner surface there are placed three recesses in the form of circular splines 10a, 10b, 10c. Each circular spline extends over an angular range of 120°. The gradient of the circular splines is relatively low, so that it can be considered practically linear. In the sample embodiment, the gradient is 1:70 or 3/10 mm for an inner diameter d of 19.2 mm. The size of the inner diameter and the gradient of the circular splines depends in the particular instance on the dimensions of the securing nut 1. The number of circular splines should be at least 2, but it can also be more.

Figure 6A:
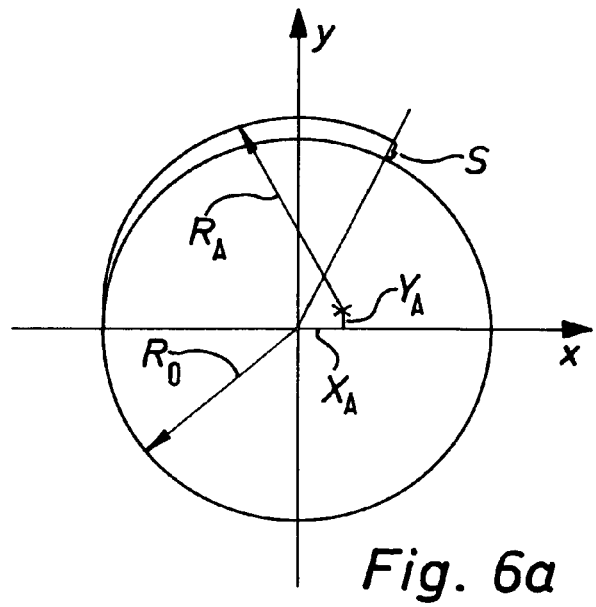
FIG. 6a a geometrical depiction for calculating the contour of the circular splines of the straining ring.

A linear gradient would be the ideal case, but such a contour of the circular splines is difficult to produce. In practice, the contour of the circular splines can be produced by a circular arc, whose midpoint is shifted relative to the midpoint of the securing nut 1. This circular arc can be computed with the following formulas (I), (II), (III) (cf. FIG. 6a):

$$X_A = 0.5 \times g \quad (I)$$

$$Y_A = (2/\sqrt{3} - \sqrt{3}/2) \times g \quad (II)$$

$$R_A = R_0 + X_A \quad (III)$$

with $R_0$=nominal radius, g=gradient

With g=0.3 and $R_0$=9.6 for the outer radius of the straining ring 4 or $R_0$=9.5 for the inner radius of the neck 2, one obtains $X_A$=0.15, $Y_A$=0.0866 and $R_A$=9.75.

Figure 6B:
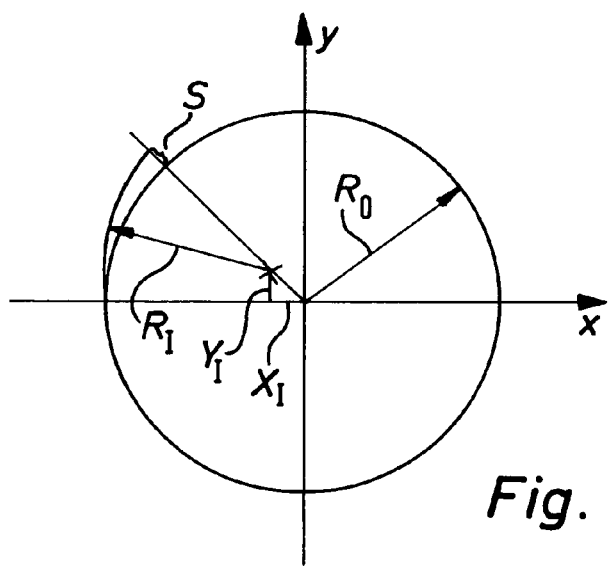
FIG. 6b a geometrical depiction for calculating the contour of the spline profiles of the neck.

The neck 2 of the nut body has the same number of cams in the form of spline profiles as the straining ring 4 has grooves. Thus, in the example of embodiment, three spline profiles 20a, 20b, 20c. Unlike the case of the straining ring 4, the spline profiles 20a, 20b, 20c of the neck 2 extend over a smaller angular span, which is 45° in the example of embodiment. The angular range can be 30 to 60°. The gradient of the spline profiles 20a, 20b, 20c also depends on the dimensions of the neck 2 and is produced by a circular arc whose midpoint is shifted relative to the midpoint of the securing nut 1. The circular arc can be computed with the following formulas (IV), (V), (VI) (cf. FIG. 6b):

$$X_I = -(\sqrt{2}+1) \times g \quad (IV)$$

$$Y_I = (\sqrt{2}+1) \times g \quad (V)$$

$$R_I = R_0 + X_I \quad (VI)$$

with $R_0$=nominal radius, g=gradient

With g=0.3 and $R_0$=9.6 for the outer radius of the straining ring 4 or $R_0$=9.5 for the inner radius of the neck 2, one obtains $X_I$=−0.7243, $Y_I$=0.7243 and $R_I$=8.7757.

Thus, the outer diameter of the neck 2 is preferably somewhat less than the inner diameter of the straining ring 4, so that the difference affords some clearance for joining the parts together; in the example of embodiment, the outer diameter of the neck 2 is 19 mm. In the example of embodiment, with an inner diameter of 17 mm and an outer diameter of 19 mm, the maximum height of the spline profiles 20a, 20b, 20c is 0.3 mm for a path of around 7.5 mm. It is advantageous for the thickness of the wall 2' of the neck 2 to be no more than 1/10 of the inner diameter. This slight wall thickness allows an elastic deformation of the neck 2.

As FIG. 2a shows, the straining ring 4 is shoved onto the neck 2 so that the elevated spline profiles 20a, 20b, 20c of the neck 2 come to overlap the hollow circular splines 10a, 10b, 10c of the straining ring. The straining ring 4 also sits on the neck 2 with a certain joint play, due to the difference between outer diameter of the neck 2 and inner diameter of the straining ring 4, and can be freely twisted in the direction of arrow A, until the joint play is used up and the cams of the neck 2 bear against the spline surfaces of the recesses of the straining ring. For example, with a joint play of 0.1 mm and a gradient of the circular splines or spline profiles of 0.3 mm per 120°, the abutment will occur after a rotation of 40°. Only then does the actual clamping effect set in with further turning of the straining ring.

The result is shown schematically in FIG. 2b. The clamping action exerted by the straining ring 4 is pointlike, namely, in the region of the edges 21a, 21b, 21c, limiting the spline profiles 20a, 20b, 20c, as indicated by the arrow a. The clamping action on the neck 2 has the result that it is slightly flattened out in the regions indicated by the arrows b and the formerly round circular contour of the inner diameter becomes somewhat triangular. This presses the inner thread 3 in the flattened region against the axle, the bolt, the shaft, the screw, etc., onto which the securing nut 1 was screwed before tightening the straining ring 4. In this way, the neck 2 is clamped to the axle, bolt, shaft, screw, etc., and protected against loosening or getting lost. This securement can be reversed, by turning the straining ring 4 opposite the direction of arrow A in FIG. 2. The elastic neck 2 resumes its circular contour as depicted in FIG. 2.

Figure 3:
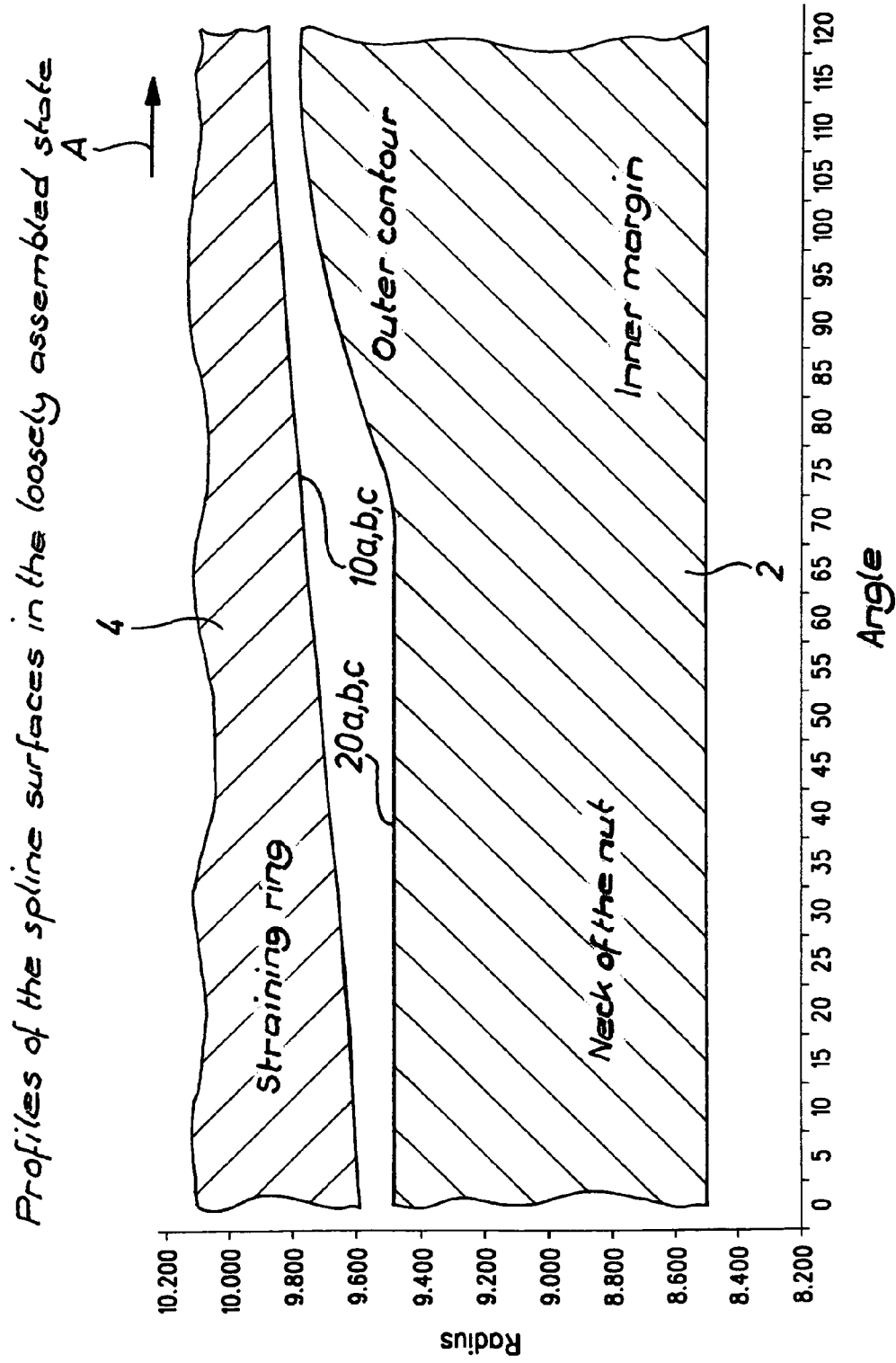
FIG. 3 a graphical representation of the inner and outer contour of the neck, the inner contour of the straining ring, and the deformation of the contours over 120° in the loose condition.
Figure 4:
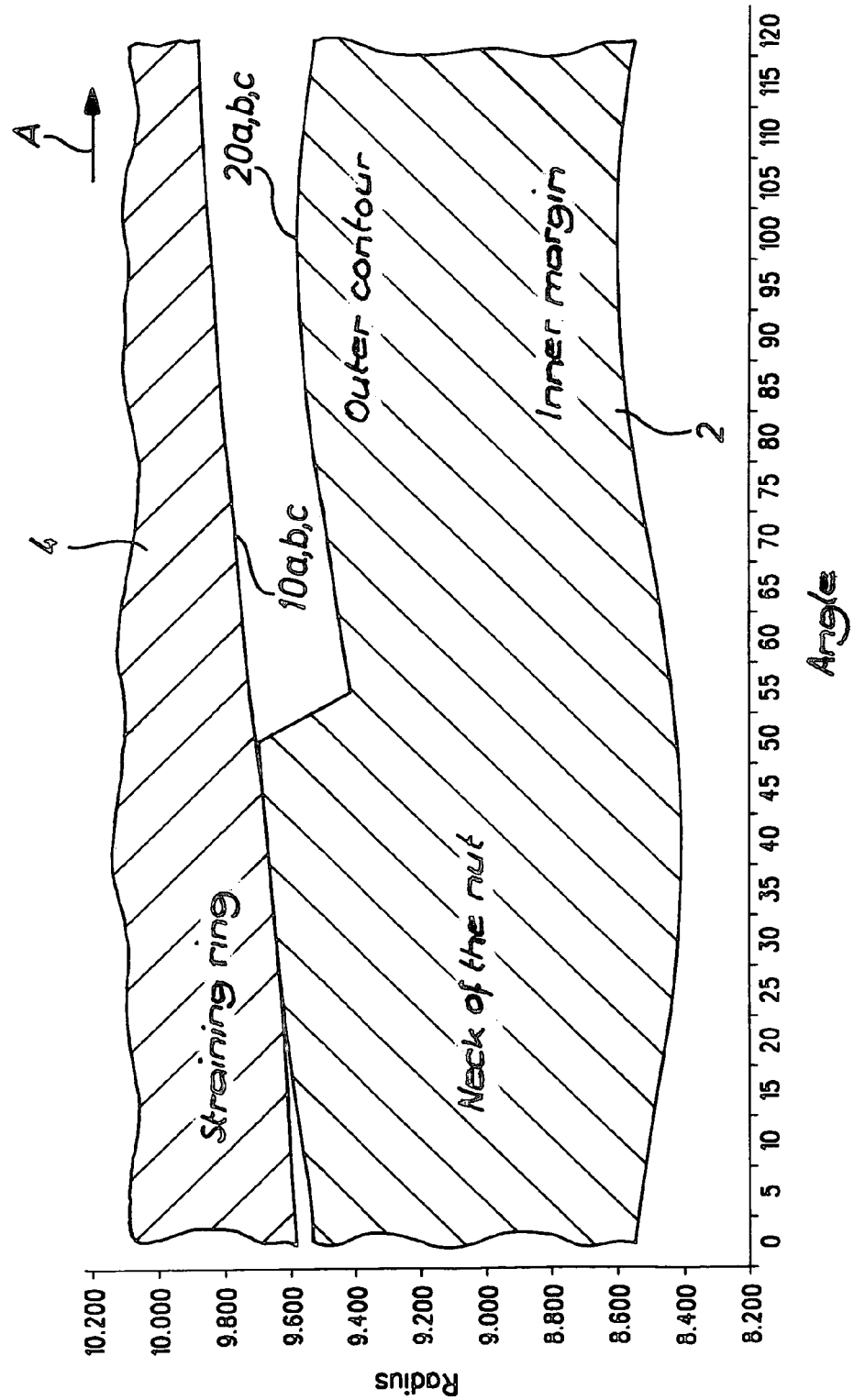
FIG. 4 a graphical representation of the inner and outer contour of the neck, the inner contour of the straining ring, and the deformation of the contours over 120° in the clamped condition.

The deformation or clamping has been calculated for the example of embodiment and plotted in the graph of FIG. 4. The graph of FIG. 3, on the other hand, shows the situation in the loose condition.

By comparing FIGS. 3 and 4, one notices the described elastic deformation of the neck 2 at three points and the variation in contour of the straining ring 4 and the neck 2. The inner contour of the straining ring 4 is essentially linear, which corresponds to a hollow circular spline 10a of the straining ring 4, extending over the entire depicted range of 120°. The variation in the outer contour of the neck 2 corresponds to a spline profile 20a of the neck 2, which only extends over an angular region of 45°. The contour of the spline profiles 20a, 20b, 20c of the neck 2 is in the shape of a circular arc (FIG. 3) before being tightened, since the contours are produced by a circular arc according to formulas (IV), (V), (VI). This contour is calculated so that, after the deformation, i.e., after the tightening of the straining ring 4 and the clamping, an approximately linear shape results, in order to achieve the most uniform possible, broad, not pointlike bearing against the essentially linear profile of the circular splines 10a, 10b, 10c of the straining ring 4. This will prevent stress concentrations. Because of the rather large wall thickness of the straining ring 4, the contour of the circular splines 10a, 10b, 10c of the straining ring 4 remains basically unchanged.

During the clamping, the neck 2 in the example of embodiment is deformed such that one region flattens out to an inner radius of 8.4 mm, adjoined by a vaulted region with an inner radius of 8.6 mm. This corresponds to the trend of a flattened region of surface and an adjoining bulging of the neck at a clamping point, designated by the arrows a in FIG. 2b. The clamping region between the circular spline 10a of the straining ring 4 and the spline profile 20a of the neck 2 extends in an angular region of between 25 and 50°. In this region, in which the neck 2 is inwardly flattened, there also occurs the clamping between the neck 2 of the securing nut 1 and the screw, shaft, bolt, axle, etc., on which the securing nut 1 is screwed.

From what has been said above it follows that the clamping or the securing effect of the invented securing nut 1 is due to the pointlike elastic, nonround deformation of the neck 2, which deviates from the round circular contour. Therefore, it is not necessary to provide precisely three circular splines or spline profiles on the straining ring 4 and the neck 2. A corresponding deformation of the neck 2 will also be achieved with two, four or five circular splines or spline profiles. The upper limit occurs when it is no longer possible to achieve a substantially nonround deformation because of too many circular splines or spline profiles.

Figure 5:
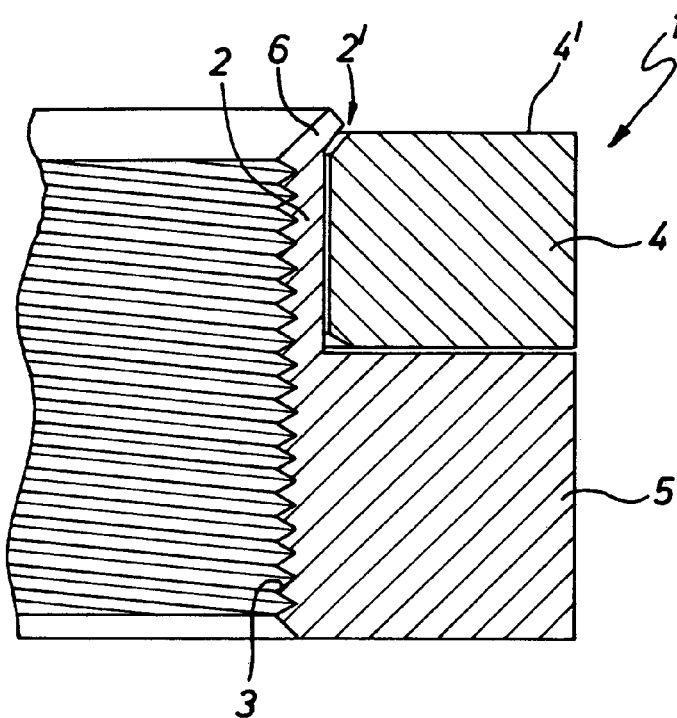
FIG. 5 a schematic, not true-to-scale representation of the securing nut according to the invention, in which both parts are inseparably joined together.

FIG. 5 shows a cross section through a securing nut 1 according to the invention, wherein the nut body 5 and the straining ring 4 are inseparably joined together. For this, a projecting margin 6 is provided at the free end 2' of the neck 2, which extends beyond the outer surface 4' of the straining ring 4 and the inner thread 3. After the assembly of nut body 5 and straining ring 4, the free end is bent outward, in the direction of the outer surface 4' of the straining ring 4, so that the straining ring 4 cannot slide off from the neck 2 of the nut body 5, despite the existing joint play.

The securing nut 1 according to the invention can be made easily and cheaply. The straining ring 4 can be made in one work step by pressing. This is more difficult for the nut body, since the center axis of the inner thread 3 must always be perpendicular to the bearing surface and the tolerance range for this is slight (in the example of embodiment, 3/100 mm). It is therefore advantageous to press a rough blank for the nut body without inner thread 3, with the wall thickness of the neck 2 being substantially larger than that of the finished nut body. The blank is then machined by cutting in a chuck, i.e., the desired wall thickness of the neck 2 is adjusted, the inner thread 3 is generated, and the bearing surface of the securing nut is produced. In this process, the inner thread 3 can also be shaped without cutting. The nut body and the straining ring 4 are then assembled together, and the projecting margin 6 of the neck 2 can be slightly bent outward, in order to keep the straining ring 4 on the nut body without danger of becoming lost.

Thus, the present invention provides a securing nut that is easy and cheap to produce, which can be clamped with maximum force and thereby especially well secured against loosening and getting lost.

What is claimed is:

1. A securing nut comprising a nut body and a straining ring rotationally arranged on the nut body, the nut body having a neck, the straining ring being shoved onto the neck of the nut body and reversibly secured thereto by clamping, an inner surface of the straining ring having at least two grooves, each of the at least two grooves being a circular arc, the at least two grooves cumulatively extending across an entire angular range of 360°, an outer surface of the neck having a plurality of cams corresponding in number to the number of grooves, each cam being associated with a groove and extending across an angular range which is different than that of the associated groove and less than 60°, wherein said neck has a continuous inner surface with a contour which is elastically reversibly deformable between a round contour and a non-round contour by compression of said neck by rotation of said straining ring and uncompression of said neck by further rotation of said straining ring.

2. The securing nut according to claim 1, wherein exactly three grooves and exactly three cams are provided.

3. The securing nut according to claim 2, wherein each groove of the straining ring extends across an angular range of 120°.

4. The securing nut according to claim 2, wherein each cam of the neck extends across an angular range of 30° to 60°.

5. The securing nut according to claim 4, wherein each cam of the neck extends across an angular range of 40° to 50°.

6. The securing nut according to claim 5, wherein each cam of the neck extends across an angular range of 45°.

7. The securing nut according to claim 1, wherein the gradient of the grooves is approximately linear.

8. The securing nut according to claim 7, wherein at least one of the gradient of the grooves and the cams is generated by a circular arc.

9. The securing nut according to claim 7, wherein the gradient of the grooves of the straining ring is 1:50 to 1:100.

10. The securing nut according to claim 9, wherein the gradient of the grooves of the straining ring is 1:70.

11. The securing nut according to claim 7, wherein the gradient of the cams of the neck is 1:20 to 1:40.

12. The securing nut according to claim 11, wherein the gradient of the cams of the neck is 1:25.

13. The securing nut according to claim 1, wherein the gradient of the cams is curved prior to the clamping of the retaining ring to the nut body.

14. The securing nut according to claim 1, wherein the gradient of the cams is approximately linear after the clamping of the retaining ring to the nut body.

15. The securing nut according to claim 1, wherein the wall thickness of the neck corresponds at most to 10% of the inner diameter of the neck.

16. The securing nut according to claim 1, wherein the depth of the grooves of the straining ring and the cams of the neck is 1% to 3% of the inner diameter of the straining ring.

17. The securing nut according to claim 10, wherein the depth of the grooves of the straining ring and the cams of the neck is 1.75% of the inner diameter of the straining ring.

18. The securing nut according to claim 1, wherein the straining ring has a hexagonal outer contour.

19. The securing nut as claimed in claim 1 wherein said neck is reversibly deformable between a round contour and a triangular contour by compression of said neck by said straining ring.

20. The securing nut according to any one of the preceding claims, wherein the nut body including the neck is provided with an inner thread.

* * * * *